United States Patent [19]

Pratt et al.

[11] Patent Number: 4,461,373

[45] Date of Patent: Jul. 24, 1984

[54] DRIVE AXLE ASSEMBLY

[75] Inventors: William J. Pratt, Cedar Rapids, Iowa; Robert E. King, Wildwood, Ill.

[73] Assignee: Dresser Industries, Inc., Dallas, Tex.

[21] Appl. No.: 335,896

[22] Filed: Dec. 30, 1981

[51] Int. Cl.³ .................. B60K 41/26; F16H 57/10
[52] U.S. Cl. .................. 192/4 A; 74/411.5; 74/391
[58] Field of Search .......... 192/4 R, 4 A, 113 B; 74/391, 411.5, 781 R, 760; 188/71.6, 264 R, 264 AA, 264 B

[56] References Cited

U.S. PATENT DOCUMENTS

| | | | |
|---|---|---|---|
| 3,754,625 | 8/1973 | Voth et al. | 74/391 X |
| 4,010,830 | 3/1977 | Logus et al. | 192/4 A |
| 4,037,694 | 7/1977 | Keese | 192/4 A |
| 4,140,198 | 2/1979 | Chamberlain | 180/75 |
| 4,142,615 | 3/1979 | Sidles, Jr. et al. | 192/4 A |

Primary Examiner—George H. Krizmanich
Attorney, Agent, or Firm—Barry E. Deutsch

[57] ABSTRACT

A drive axle assembly including a housing structure having a fixed spindle, a nonrotatable spacer ring disposed about the spindle and a drive hub rotatably mounted on the spindle by bearings, one of which abuts the spacer ring. The spacer ring has a brake apply fluid inlet to an interior passage which opens to a first sealed annular cavity between the spacer ring and the hub. The exterior of the spacer ring defines in conjunction with the drive hub a second low pressure cavity therebetween enclosed by a radial face seal having a rotating portion disposed in the hub and a nonrotating portion disposed in the spacer ring. Lubricating and cooling fluid is pumped through the second cavity to cool the face seal and continues through passages in the drive hub to provide a nearly continuous flow to the drive and brake components in the hub assembly. The specific location of the brake apply cavity interiorly adjacent the lower pressure lubricating cavity also minimizes the effect of small leakages past the seals of high pressure in the brake apply cavity.

20 Claims, 4 Drawing Figures

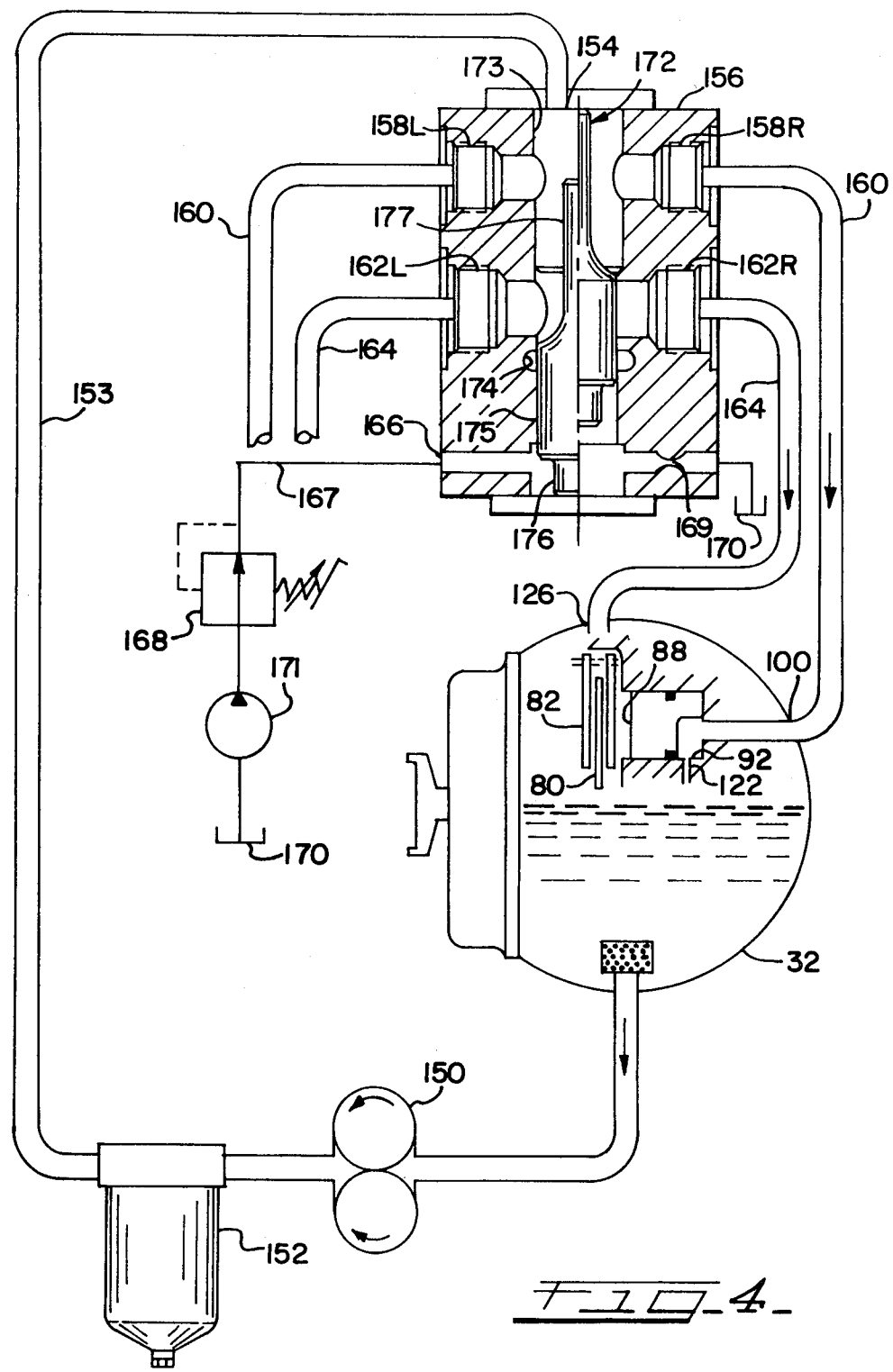

DRIVE AXLE ASSEMBLY

CROSS REFERENCE TO RELATED APPLICATIONS

This application is related to the following applications assigned to the assignee hereof:

Ser. No. 335,948, filed Dec. 30, 1981 entitled AXLE DRIVE AND BRAKE ASSEMBLY by Kenneth E. Houtz, William J. Pratt, and Robert E. King.

Ser. No. 336,003, filed Dec. 30, 1981 entitled DRIVE AXLE FLUID SYSTEM by Kenneth E. Houtz.

Ser. No. 336,218, filed Dec. 31, 1981 entitled INTERNAL BRAKE by Karl Salna, Donald F. Rudny and Stanley Urman.

BACKGROUND OF THE INVENTION AND THE PRIOR ART

This invention is related to drive axles for heavy vehicles, such as wheel loaders, of the type having drive hub assemblies rotatably mounted to the respective ends of the axle housing and having planetary gear drives therein and, more particularly, to an apparatus for transferring fluids from the nonrotating axle housing to the rotating drive hub assembly.

It is previously known to use a nonrotatable spacer ring to fix the axial position of the inner bearing mounting the planetary gear drive hub assembly on an axle housing. Such is shown, for example, in Chamberlain U.S. Pat. No. 4,140,198. However, the prior art drive axle assemblies, as also shown in Keese U.S. Pat. No. 4,037,694, and Sidles, Jr. et al. U.S. Pat. No. 4,142,615, utilized a pool of oil for cooling and lubricating and hydraulic passages in the fixed spindle for actuating the brake pack. In the referenced copending applications, a brake pack is provided in the drive hub assembly wherein all portions of the brake pack and the actuating means therefor rotate relative to the spindle. Consequently, it requires that for actuating the brake, the actuating fluid be transferred from the nonrotating spindle to the rotating hub assembly.

Accordingly, a primary object of the invention described and claimed herein is to provide a drive axle assembly of the type described with a means associated with the axle spindle for establishing a fluid tight transfer of operating fluid to the drive hub assembly.

A more specific object is to provide a drive axle assembly with a structure for communicating brake actuating fluid pressure from the stationary axle structure to the rotatable wheel hub assembly.

A further object of the invention is to provide in a drive axle assembly a structure for communicating lubricating and cooling fluid under pressure from the stationary axle structure to the drive and brake components in the rotating wheel hub.

Still a further object of the invention is to provide the drive axle assembly with a housing for stationary portion of the primary oil face seal located between the environment and the interior of the axle structure.

Yet another object of the invention is to circulate the pressurized fluid for the drive and brake components past the aforesaid seal to also effect cooling thereof.

A more specific object is to provide in a drive axle assembly a single structure meeting, in cooperation with the surrounding structure, all of the above objects while also functioning as the prior art bearing spacer ring which eliminates a stress concentrating sharp corner on the spindle.

The above objects and others which will become apparent hereinafter are specifically met in a drive axle assembly including a housing structure having a fixed spindle, a nonrotatable spacer ring disposed about the spindle and a drive hub rotatably mounted on the spindle by bearings, one of which abuts the spacer ring. The spacer ring has a brake apply fluid inlet to an interior passage which opens to a first sealed annular cavity between the spacer ring and the hub. The exterior of the spacer ring defines in conjunction with the drive hub a second low pressure cavity therebetween enclosed by a radial face seal having a rotating portion disposed in the hub and a non-rotating portion disposed in the spacer ring. Lubricating and cooling fluid is pumped through the second cavity to cool the face seal and continues through passages in the drive hub to provide a nearly continuous flow to the drive and brake components in the hub assembly. The specific location of the brake apply cavity interiorly adjacent the lower pressure lubricating cavity also minimizes the effect of small leakages past the seals of high pressure in the brake apply cavity.

DETAILED DESCRIPTION OF THE DRAWINGS

Other objects and advantages of the invention will become more apparent upon reference to the following detailed description of the preferred embodiment and upon reference to the drawings, in which:

FIG. 3 is an enlarged vertical sectional view of the upper portion of the axle assembly of one wheel of FIG. 1, taken along the line 3—3 thereof, being rotated 90° from FIG. 2, except deleting the planetary drive and brake components, and showing the lubricating oil flow arrangement used in the axle assembly; and FIG. 4 is a schematic view of the axle fluid system.

DETAILED DESCRIPTION OF THE PREFERRED EMBODIMENT

Figure 1:
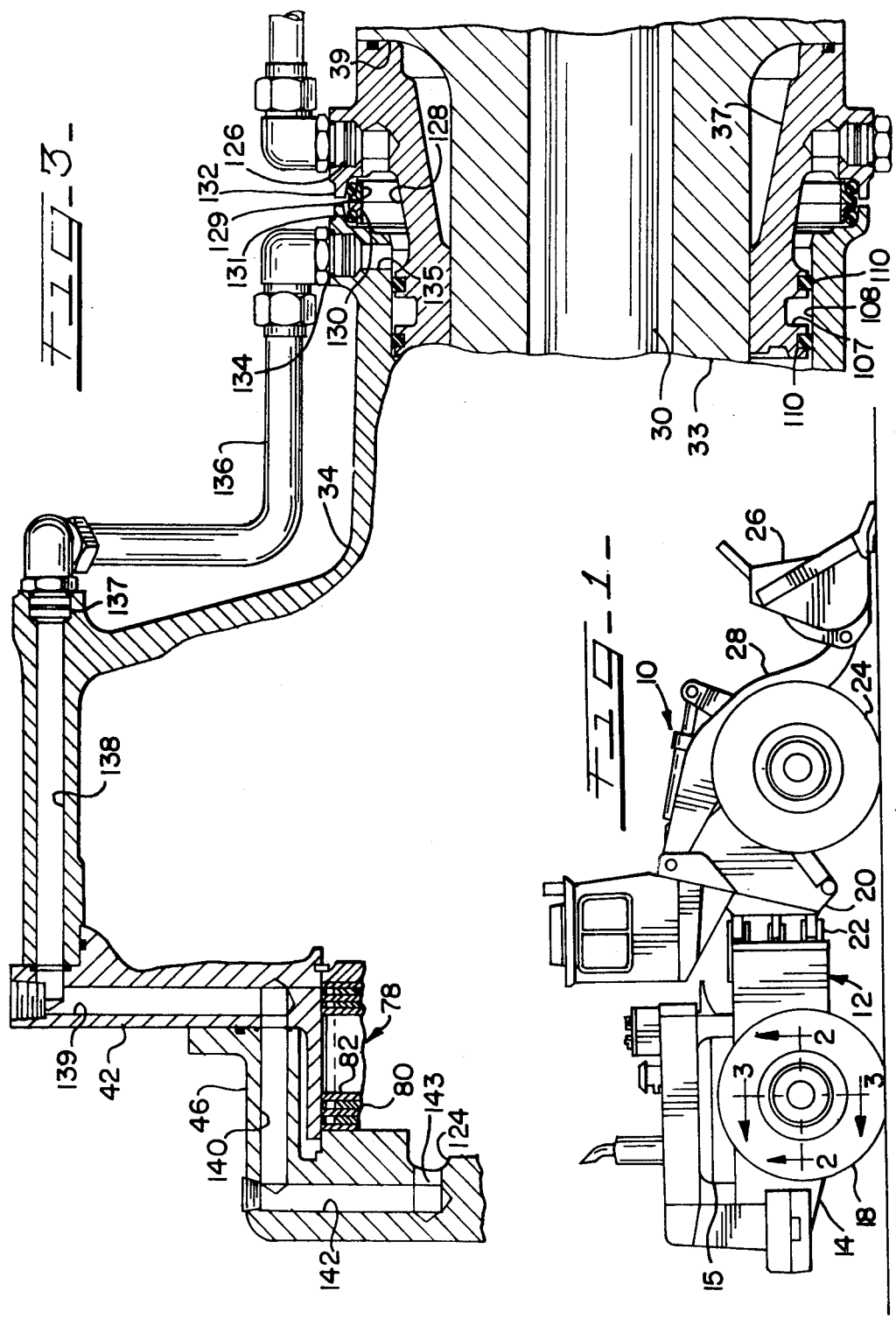
FIG. 1 is an elevational view of a wheel loader vehicle incorporating the improved drive axle assembly in at least one and preferably all of the wheels of the vehicle.

Referring now to the drawings, there is shown in FIG. 1, a wheel loader 10 having an articulated frame 12, the rear portion 14 of which contains an engine 15 and is supported by rear wheels 18. The front portion 20 of the frame is pivoted at 22 to the rear frame portion 14 and is supported by front wheels 24. A loader bucket 26 is mounted to the end of lift arms 28 supported by the front frame 20.

Figure 2:
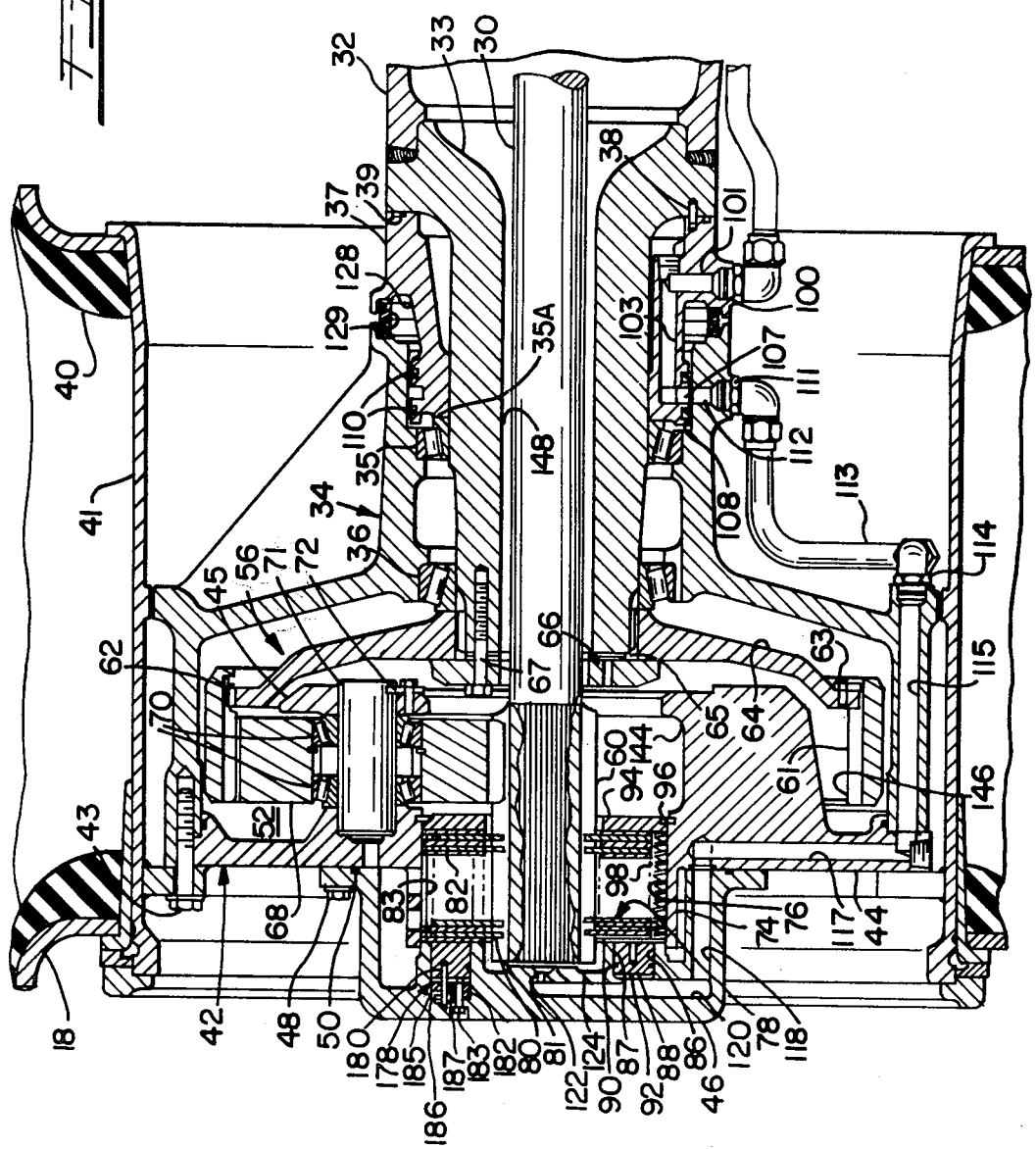
FIG. 2 is an enlarged horizontal sectional view taken through the axle assembly of one of the wheels of the vehicle of FIG. 1, along the line 2—2 thereof, and showing the important aspects of the invention.

The invention is directed to a drive axle assembly incorporating a planetary gear system that can be used in conjunction with any of the wheels illustrated in FIG. 1 and preferably on all four of the wheels. Referring to FIG. 2, a drive axle shaft 30 which is driven from the engine 15 through a transmission and a differential (not illustrated), is supported to rotate within a non-rotating axle and differential housing, portions thereof being shown at 32, trunnion mounted on a longitudinal axis to the frame 12 of the vehicle. An elongated spindle 33 having an axial bore is welded or otherwise nonrotatably secured in outwardly exending relation from the axle housing. A wheel hub assembly 34 is rotatably mounted on the spindle 33 as by inner and outer bearings 35 and 36, the inner bearing 35 abutting a spacer ring 37, fixed against rotation as by pin 38, circumferentially disposed about the spindle and abutting on exterior shoulder 39 thereon. Inner bearing 35 rotates within inner race 35A. The spacer ring 37 thus locates the bearing 35 without adding a stress concentrating small radius shoulder to the spindle at the bearing mounting. As will be obvious from the drawing, the spacer ring 37 has many other functions which will be described subsequently. The outer diameter of spindle 33 is reduced axially outwardly to permit easy installation of the inner bearing 35 thereon and terminates in a splined end beyond the outer bearing 36.

The tire 40 of the vehicle wheels 18 or 24 is secured in place on a peripheral rim assembly 41 secured to the wheel hub assembly 34 exteriorly of a planet carrier 42, as by a large number of circumferentially spaced bolts 43 extending through both the rim and carrier into taps in the hub assembly, so that both will rotate with the hub assembly relative to the spindle 33 and stationary axle housing 32. The planet carrier 42 is a one piece casting disposed about the drive shaft 30 and has an exterior radial wall 44 and an interior radial wall 45. A cover 46 having a flanged outer perimeter sealed by O-ring 50 is secured by a plurality of removable bolts 48 to the exterior radial wall 44 of the planet carrier 42. Thus, the hub assembly 34 has an interior chamber 52 partially enclosed by the planet carrier 42 and the cover 46.

A planetary gear drive assembly 56 is disposed in the hub chamber 52 between the rotating drive shaft 30, the stationary spindle 33 and the planet gear carrier 42 which carries the wheel hub. The planetary gear system includes a sun gear 60 keyed to or formed integrally on the drive shaft 30 at its outboard end and a ring gear 61 keyed against rotation to splines 62 on the peripheral edges of ring gear carrier 64, and secured against axial movement by bolts 63. The inner portion of the carrier 64 is keyed by internal spines 65 to the splined end of the spindle 33. An annular retainer plate 66 attached to the end of the spindle 33 by bolts 67 in axial taps therein retains the ring gear carrier 64 on the spindle 33. The hub of the ring gear carrier 64 further functions as a spacer working against the inner race of the outer wheel hub bearing 36 so that the bearing 35, hub 34, bearing 36, and spacer ring 37 are in continuous abutment to the spindle shoulder 39, shims being disposed between the spindle 33 and the ring gear retainer plate 66 to provide the desired amount of preload on the bearings.

The planetary gear drive assembly 56 further includes a plurality of circumferentially spaced planet gears 68 (only one being shown) engaged with the sun gear 60 and with the ring gear 61, each planet gear being supported rotatably by bearings 70 on a stub shaft 71 secured between the radial walls 44 and 45 of the planet gear carrier 42, being locked therein by a bolted plate 72 received in a corresponding groove in the stub shaft 71. Thus, the rotation of the drive shaft 30 and sun gear 60 causes the planet gears 68 to rotate, and the planet gear carrier 42 to rotate in turn relative to the stationary ring gear 61. The speed reduction ratio can be quite high in such a planetary gear arrangement, on the order of about eight to one for the arrangement shown, so that the wheel hub 34 is rotated at a slower speed, but with higher torque, than the input speed of the drive shaft 30.

The planet gear carrier 42 has an integrally cast annular wall 74 disposed axially and concentrically about the outboard end of the drive shaft 30 and defining a cylindrical cavity 76 opening outboardly or endwardly of the drive shaft. A brake pack 78 is fitted within the cavity 76 and includes two sets of discs 80 and 82 interfitted with one another. Each disc 80, which is provided with friction material on its surfaces disposed to engage the discs 82, has an internal spline that cooperates with the axially extended teeth 81 of the sun gear 60 thereby keying all the discs 80 to the drive shaft 30 while allowing axial movement thereon. The friction material on the disc 80 is grooved in a crosshatch pattern to assist in drawing oil between the discs 80, 82. Each disc 82, which has a metallic surface disposed to engage the discs 80, has an exterior spline that cooperates with a mating internal spine 83 on the annular wall 74 of the planet gear carrier 42 so that all of the discs 82 are keyed to the planet carrier while being movable axially thereon. Since both sets of discs rotate, the materials of the discs 80, 82 could be interchanged with little effect.

A brake actuating means is disposed in the planetary gear cover 46 which has a pair of spaced annular walls 86 and 87 defining a groove opening toward the brake pack cavity 76 which is axially and concentrically disposed relative to the drive shaft 30. An annular piston 88 fits between the annular walls 86 and 87, seals 90 in the piston walls establishing rearwardly of the piston and remotely from the brake pack 78, an annular pressure chamber or cylinder 92 for fluid actuation of the brakes. An annular backing plate 94 is disposed in the brake pack cavity 76 on the inboard end of the brake pack 78 and a split ring 96 fitted within an annular groove in the annular wall 74 of the planet gear assembly 42 holds the backing plate 94 against inboard axial movement. Optionally, the ring 96 and even plate 94 could be integral with the planet carrier 42. A plurality of coiled compression springs, one of which is shown at 98, are located between the outboardmost brake disc 82 and the backing plate 94 for the purpose of providing a mechanical release of the brake pack 78 when the brake cylinder 92 is depressurized. It will be seen that upon pressurizing the annular brake cylinder 92, the annular brake piston 88 is driven axially inboard along the drive shaft and against the brake pack 78 causing the two sets of brakes discs 80 and 82 to frictionally engage each other. Therefore, in the brake-engaged position, the input drive shaft 30 and the sun gear 60 integral therewith is held against rotation relative to the planet gear carrier 42. When any two components of a three component planetary gear system are stopped relative to one another, the entire planetary gear system is stopped and locks up. Accordingly, by braking the relatively rotating members, i.e., the planet carrier and the sun gear, the planet gear carrier becomes locked relative to the ring gear and, accordingly, the wheel hub assembly 34 becomes locked relative to the fixed spindle 33 or the frame 12 of the vehicle.

Automatic adjusting means are also incorporated in the cover assembly to preclude the unlimited release of the brake pack 78 upon its disengagement. This is accommodated by means of a slack adjuster 178 which includes a dowel pin 180 secured to the annular piston 88 and slidingly supported within a plug 182 held by a bolt 183 to the radial wall of the cover 146 and defining a cavity therebetween around the dowel pin 180 which receives a washer 185 positioned with clearance over the dowel pin. A compression spring 187 mounted in the plug 182 engages one edge of the washer 185 and forces it into a canted position so that the inner portion of the washer 185 engages the dowel pin while the outer surface of the washer opposite the compression spring engages a raised corner in the cover 46 as at 186. Upon pressurization of the brake cylinder 92 and the axial displacement of the piston 88, the dowel pin 180 is caused to slide within the washer 185 and possibly shift its position inboardly relative to the washer. Upon depressurization of the cylinder 92, the springs 98 release the brake and cause the brake piston 88 to be moved axially away from the brake pack 78. The washer 187 strikes the cover corner 186 and cants causing the inner diameter of the washer to engage the dowel pin 180 thus precluding the complete return of the brake piston 88 into the cylinder 92. This automatically compensates for wear of the brake pack discs 80 and 82. Three or more of the slack adjuster assemblies 178 can be equally spaced around the circumference of the cover.

The operating fluid for actuating the brake piston 88 is supplied to the drive axle assembly from a single fluid system providing brake apply pressure, cooling and lubricating fluid, and differential gear lubrication, which will be described in detail hereinafter, to an input port 100 in the spacer ring 37 disposed about the spindle 33 inboard of the wheel hub assembly 34. The port 100 communicates via a radial passage 101 with an axially extending passage 103 in the spacer ring. The outside diameter of the nonrotatable spacer ring 37 reduces in size outboardly to an outboard end telescoping within the wheel hub assembly 34 and thereat is provided with an annular groove 107 defining a cavity between the hub assembly and spacer ring opened to the axial passage 103 and to the annular inner wall 108 of the hub assembly. Square section metal filled ring seals 110 of the type conventionally used in transmissions are located on opposite sides of annular groove 107 to maintain a pressurized fluid seal of the groove 107 while allowing the wheel hub assembly 34 to rotate relative to the spacer ring 37 and spindle 33. On the external side of the wheel hub 34, another port 111 communicates via radial passage 112 with the annular wall 108 of the hub and cavity. The wheel hub port 111 communicates by a pressure tube 113 with a port 114 at the entrance of an axially extending passage 115 in the circumferential wall of the hub assembly 34 which extends into the planet gear carrier 42. The radial wall 44 of the planet gear carrier 42 in turn is provided with a radial passage 117 communicating with the passage 115 and which in turn communicates with an axially extending passage 118 extending therefrom into the cover 46 to a radial passage 120 in the outboard wall thereof. The radial passage 120 opens into the annular brake cylinder 92 formed in the cover 46 and with the base of the brake piston 88. Thus, a passage means is disposed in the hub which establishes fluid communication between the input port 100 on the spacer ring 37 and an outlet into the brake cylinder 92 so that brake apply pressure at the input port 100 will activate the brake pack 78. As is illustrated, the hub assembly 34, planet gear carrier 42 and cover 46 are separate components secured together and, accordingly, at the interfaces in the passages 115, 117, 118, small O-rings are disposed in grooves to preclude leakage pass the abutting components. Additionally, a bleed orifice 122 is disposed in the radial passage 120 of the cover 46 near the center of the axle shaft 30 for the purpose of allowing the brake fluid to continually circulate through the passages and lines described above in order to prevent congealing of the brake fluid under cold operating conditions. The orifice 122 bleeds to a cavity 124 defined within the cover 46 surrounding the outboard end of the drive shaft 30.

Operating fluid for cooling and lubricating the brake pack 78, as well as the various bearings 35, 36 and 70, is also supplied from the same fluid system to an input port 126 (FIG. 3) which is located on the top side of the spacer ring 37, that is, rotated 90° from the brake fluid input port 100 shown in FIG. 2. The input port 126 communicates with a second cavity 128 defined by the outside wall of the spacer ring 37, the hub 34, and a pair of face seals 129, of the conventional type shown, for example, in the aforementioned Sidles patent, each comprising a metal seal ring 130 disposed within a rubber compression ring 131, the radial faces of the rings 130 being disposed in mating relation within the annular outturned edges 132 respectively of the seal ring 37 and wheel hub assembly 34. Thus, a seal is maintained between the hub and spacer ring sealing the exterior of the axle assembly from the interior while permitting relative rotation therebetween. The second cavity 128 is also sealed from the first cavity 107 by the seals 110. The wheel hub 34 is provided with a port 134 communicating via radial passage 135 with the second cavity 128. Thus, a second fluid tight passage is provided between the fixed spacer ring 37 and the rotating hub assembly 34 for the passage of lubricant which also has the benefit of cooling the seals 129. Further, due to its axially adjacent location, leakage from the adjacent high pressure brake apply cavity 107 will leak into the low pressure second cavity rather than exteriorly of the axle. A tube 136 connects the port 134 with a second port 137 opening into an axially extending passage 138 in the circumferential wall of the wheel hub assembly and extending into the planet carrier assembly 42 whereat the passage 138 intersects a radial passage 139 in the wall 44 of the planet carrier 42. The planet carrier passage 139 communicates with an axially extending passage 140 predominately in the cover 46 intersecting a radial passage 142 in the cover which in turn has an unrestricted outlet as at 143 into the cavity 124 adjacent the end of the drive shaft 30. This provides for relatively continuous lubrication and cooling of the gears, bearings and the brake discs.

In the latter regard, the inner portion of the brake discs 80 and 82 are each radially slotted in a conventional manner to allow lubricant flow adjacent the spline 60 on the drive shaft 30 to permit flow to each disc and radially among the discs and filling at least the lower half of the cavity 76. The lubricant flows past the backing plate 94 to an internal cavity 144 formed within the planet gear carrier and lubricates the bearings 70 located between the stub shaft 72 and the planet gear 68. The lubricant further fills the ring gear containing cavity 146 of the wheel hub assembly and lubricates the wheel hub bearings 35 and 36. With all the cavities 76, 144, 146 filled up to the level of the bore of the spindle 33, the lubricant is sent back to the differential housing 32 along the clearance space 148 between the axle shaft 30 and the spindle 33. In this connection it is noted that even though the cavities fill up only half way, since all of the bearings 35, 36, and 70 and the sun and planet gears 60, 68, as well as both sets of brake discs 80 and 82, rotate during operation of the vehicle (except the inner races of bearings 35, 36), more than adequate lubrication and cooling of all of these components is maintained. As previously indicated, the metallic face seals 129 between the hub and spacer ring are also cooled by the lubricant passing through the cavity 128 behind them. Due to its pressurization, the cavity 128 is substantially filled during operation.

Referring now to FIG. 4, there is shown schematically the combined operating fluid system which actuates the brake pack 78, provides the lubrication and cooling for the entire axle drive and brake assembly, and also lubricates the differential gearing (not shown) within the differential housing 32. (The term "operating" is used to distinguish from the vehicle hydraulic control systems and their fluids). Of significant note, is that a single operating fluid, preferably an extreme pressure (EP) gear lubricant of high viscosity such as 85W-140, is used to provide all these functions. Viewed in detail, the operating fluid is supplied to a transmission driven gear pump 150 from the differential housing 32 of the axle assembly which functions as a reservoir. The operating fluid is pumped through a filter 152 and a pressure line 153 into the input port schematically illustrated at 154 of a brake apply valve 156. The brake apply valve 156 has left and right output ports 158L, 158R respectively, which are connected via tubes 160 to the brake apply input ports 100 at the left and right wheels of the axle respectively. Adjacent the brake output ports 158 are lubricant output ports 162L and 162R which are connected respectively by tubes 164 to the lubrication input port 126 on the spacer ring 37. Further spaced from the brake apply ports 158 is an input port 166 which is connected to a pilot pressure line 167 in turn connected to a pedal actuated brake pilot control valve 168 having a linearly increasing pressure output with pedal stroke located in the operator's compartment of the vehicle. In the brake release position of the pedal, the control valve maintains a small amount of continuous circulation in the pilot control line 168 which flows through an orifice 169 on the right side of the valve 156 back to the transmission hydraulic fluid reservoir 170. It is noted in this regard that the brake pilot control system operates on hydraulic fluid from the transmission hydraulic system pump 171 rather than on the gear lubricant used on the operating fluid side of the brake apply valve 156. A sliding valve spool 172 is disposed in a relatively close fit in spool bore 173, the valve spool 172 being shown at the extreme limits of its travel respectively on the left and right sides of the valve 156 illustrated in FIG. 4. Since the pilot control system operates on transmission hydraulic fluid, an annular groove 174 is disposed in the spool bore 173 between the pilot control input port 166 and the operating fluid lubricating output ports 162. The groove 174 is connected to the operating fluid inlet 154 as by an internal passage in the valve body (not shown) which should be sufficient to provide adequate separation of the fluids since the pressure differential across the spool body is zero because the control pressure and inlet pressure are nearly always equal.

The valve spool 172 comprises a cylindrical body portion 175 slidingly fit in the valve bore 173 between the lubricant output ports 162 and the control pressure port 166, a short control side axial stem of smaller diameter than the body 175 extending therefrom to the control side and an elongated operating side axial stem 177 extending from the body portion to the operating fluid side. The relative axial lengths of the body 175, control side stem 176, and operating side stem 177 are configured so that a part of the body portion is always between the ports 162 and 166 and covering the annular groove 174, that when the control side stem 176 contacts the end of the valve 156 on the control pressure side, as shown on the left side of the valve in FIG. 4, both operating fluid output ports 162, 158 are open, and that when the operating side stem 177 contacts the end of the valve 156 on the operating side, as shown on the right side of the valve in FIG. 4, the body portion 175 closes off the lubricant output ports 162 while leaving the brake apply output ports 158 open.

In operation of the operating fluid system, the pump 150 removes gear lubricant operating fluid from the differential housing 32 and pumps it through the filter 152 and into the operating side of the brake apply valve 156 at input port 154. Since the pilot control circuit pressure in the line 168 is maintained at a relatively low level in the absence of a braking signal from the operator, the valve spool 172 moves toward the control side limit of travel, the control side stem 176 preventing the body 175 of the spool 172 from closing off the pilot control pressure input port 166 and the orifice 169 so that control pressure hydraulic fluid is circulated through the control pressure side of the brake apply valve 156 continually. The valve spool acts as a pressure regulator to maintain the operating side at the same pressure as the control side and since there is little restriction in the lubricating fluid passages, the gear lubricant operating fluid will be pumped past the operating side stem 177 of the valve spool 172 through the lubricating output ports 162 and circulated through the line 164 into the lubricating input port 126 on the spacer ring 37 (FIG. 3) and thereafter through the cavity 128 and the above-described hub assembly passages into the cavity 124 adjacent the drive shaft 30 and brake pack 78 at the outboard end of the axle assembly. A small amount of lubricant also flows through the brake apply passages and out the orifice 123 to the cavity 124. When the operator depresses the brake pedal, the pilot control valve 168 increases the pressure in the pilot control line 168, generally proportional to the brake pedal travel. This pressure forces the valve spool 172 momentarily to the operating side limit of travel, as shown in the right side of FIG. 4, so that the spool body 175 closes off the lubricating ports 162 while leaving the brake ports 158 open. Since the brake circuit is restricted, opening only to the brake cylinder 92 and the orifice 123, the pressure on the operating side of the valve spool 172 will quickly build up until it equals the pilot pressure in the line 166, simultaneously pressurizing the brake line 160 and ultimately the brake annular cylinder 92 forcing the brake piston 88 against the brake pack 88. The pressure at the operating fluid inlet 154 will continue to increase until it overcomes the pilot pressure on the pilot side of the valve spool 172 causing the spool to move downwardly and opening the lubricant ports 162 so that the flow from the operating fluid circuit again exits through the lubricating output ports 162, the valve spool 172 reaching an equilibrium position with the ports 162 partially open. Thus, during braking, the flow of lubricant is momentarily cut off but is immediately resumed after the pressure in the operating fluid circuit 153 rises to equalize the pilot pressure in line 168. Then, lubrication is resumed no matter how long braking lasts.

Thus, it will be seen that there has been provided in accordance with the invention, a drive axle assembly which fully meets the objects, aims and advantages set forth above. Although the invention has been described in conjunction with a preferred embodiment, it should be understood that the invention should not be limited thereto. For example, although described in conjunction with a wheeled vehicle, it will be apparent that the hub assembly could be coupled by a sprocket to an endless track. It is further appreciated that those of ordinary skill in the art in view of the foregoing description will note many other alternatives and modifications which may be made without departing from the true invention. Accordingly, it is intended to embrace all such alternatives and modifications as fall within the scope of the appended claims.

What is claimed is:

1. A drive axle assembly for a vehicle comprising:
  a housing structure having a nonrotatable hollow spindle mounted thereto, said spindle having an external shoulder facing away from said housing structure;
  a drive shaft extending through and projecting from the spindle;
  a nonrotating spacer ring circumferentially disposed about said spindle and abutting said spindle shoulder;
  a bearing disposed circumferentially about said spindle and having an inner race abutting said spacer ring;
  a drive hub assembly having an internal chamber and mounted on said bearing for rotation relative to said spindle, said hub assembly being adapted for coupling with a ground engaging drive member;
  a planetary gear drive assembly disposed within said hub chamber and operatively interconnecting said drive shaft and said hub;
  spacer ring passage means in said spacer ring opening to a sealed cavity between the spacer ring and the hub assembly; and
  hub passage means operatively associated with said hub assembly and establishing fluid communication between said sealed cavity and a remote outlet adjacent said planetary drive assembly.

2. The invention according to claim 1 and said hub passage means outlet opening into said cavity and said spacer passage means having means for communication with a pressure source of lubricating fluid associated with said vehicle.

3. The invention according to claim 1 or claim 2 and said hub and said spacer having cooperating seal means sealing an interior portion of said axle assembly from the exterior including a rotating seal element disposed in said hub and a nonrotating seal element in said spacer, said cavity being open to one side of said seal means.

4. The invention according to claim 3 and said seal elements being metallic rings having radially extending faces in mutual engagement and axially extending surfaces adjacent said cavity.

5. The invention according to claim 2 and a brake means disposed in said chamber.

6. The invention according to claim 1 and a brake means disposed in said chamber and having a fluid actuated means associated therewith, said hub passage means outlet opening into said fluid actuated means and said spacer passage means having means for communicating with a selectively actuated fluid pressure source associated with the vehicle.

7. The invention according to claim 6 and the spacer ring having an external annulus adjacent a concentric surface of said hub and a pair of circumferential seals disposed in sealing relation between said spacer ring and said hub axially adjacent the respective ends of the annulus.

8. The invention according to claim 6 and said hub passage means having a restricted passage opening to said chamber.

9. The invention according to claim 1 further comprising brake means disposed within said chamber and operatively associated with the drive assembly and a fluid actuated means associated with said brake means for effecting operation thereof, said hub passage means remote outlet opening to said fluid actuated means and a second spacer ring passage means opening to a second sealed cavity between said spacer ring and said hub assembly and a second hub passage means associated with said hub assembly and establishing fluid communication between said second sealed cavity and said hub chamber.

10. The invention according to claim 9 and said hub assembly and said spacer ring having a cooperating seal means therebetween enclosing said cavity from the exterior of said axle assembly.

11. The invention according to claim 10 and said cooperative seal means comprising a radial face seal including rotating and nonrotating metallic seal elements associated respectively with the hub and the spacer ring.

12. The invention according to claim 11 and said spacer ring having an annulus concentrically adjacent said hub assembly and communicating with said spacer ring passage means, and a first circumferential seal between said spacer ring and said hub assembly located between said annulus and said second cavity and second circumferential seal between said spacer ring and said hub assembly and located between said annulus and said hub chamber.

13. A vehicle drive axle assembly comprising:
  a housing structure including a nonrotatable hollow spindle;
  a drive shaft projecting from the spindle;
  a drive hub assembly rotatably mounted on the spindle and having an internal chamber, said hub assembly adapted for coupling with a ground engaging member;
  a planetary gear drive and braking means disposed in said hub chamber and operatively associating said drive shaft, and hub, and said spindle;
  a cooperative seal means disposed between said housing structure and said hub assembly and establishing a seal between the portion of said hub assembly and the exterior of said axle assembly;
  a cavity defined by said housing structure and said hub assembly and capable of maintaining fluid under pressure disposed interiorly adjacent said seal means; and
  passage means associated with said axle assembly for delivering pressurized fluid to said planetary drive and braking means, said cavity being disposed in the passage means between the inlet and outlet.

14. The invention according to claim 13 and said passage means comprising a hub passage means disposed in said hub assembly and a housing passage means disposed in said housing structure.

15. The invention according to claim 13 or claim 14 and said passage means outlet opening into said hub chamber.

16. The invention according to claim 13 or 14 and said housing structure comprising a nonrotatable ring disposed about said spindle and having said seal means, cavity, and passage means associated therewith.

17. The invention according to claim 16 and said hub assembly being mounted on a bearing to said spindle, said ring functioning as a spacer for locating said bearing axially on said spindle.

18. A vehicle having a source of power, a source of brake control pressure and a source of lubricating fluid pressure associated with said power source, a drive axle assembly comprising a housing structure terminating in a hollow spindle, having an axially outward facing shoulder, a drive shaft operably associated with said power source and projecting from said spindle, a spacer ring non-rotatably mounted circumferentially about said spindle and abutting said shoulder, a bearing mounted on said spindle in abutting relation to said spacer ring, a wheel hub assembly operatively connected to said drive shaft mounted on said bearing for rotation relative to said spindle and having an interior chamber brake means disposed in the chamber for effecting braking of said wheel hub spacer ring having brake apply passage means associated with said brake control pressure source opening to a first sealed cavity between said spacer ring and said hub assembly, and said hub assembly having brake apply passage means associated with said brake means and opening to said first cavity, said spacer ring further having lubricating fluid pressure passage means associated with said source of lubricating fluid pressure and opening to a second cavity disposed between said spacer ring and said hub assembly and said hub assembly having lubricating fluid passage means opening to said second cavity and communicating with said hub interior chamber for lubricating said brake means.

19. The invention according to claim 18 and a radial face metallic seal means disposed between said spacer ring and said hub assembly and having an interior metallic surface adjacent said second cavity to promote cooling of said seal means.

20. The invention according to claim 19 and said first cavity being disposed interiorly of said second cavity and a pair of seals being disposed respectively between said first and second cavities and between said first cavity and said interior chamber.

* * * * *